(12) United States Patent
Thomson et al.

(10) Patent No.: US 6,937,164 B2
(45) Date of Patent: Aug. 30, 2005

(54) METHODS AND APPARATUS FOR TRANSPORTATION VEHICLE SECURITY MONITORING

(75) Inventors: Deane A. Thomson, Kent, WA (US); David R. Lee, Renton, WA (US); Roger R. Brinkley, Woodinville, WA (US); Jerry L. Price, Sammamish, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 10/368,166

(22) Filed: Feb. 17, 2003

(65) Prior Publication Data

US 2004/0160340 A1 Aug. 19, 2004

(Under 37 CFR 1.47)

(51) Int. Cl.[7] .............................................. G08B 21/00
(52) U.S. Cl. .................... 340/945; 340/963; 340/425.5; 340/539.13
(58) Field of Search ........................ 340/425.5, 426.18, 340/426.19, 426.23, 426.25, 506, 539.1, 539.13, 945, 963, 988, 937, 958, 971, 973, 539.11, 539.12, 539.16, 539.17; 348/143, 148, 159

(56) References Cited

U.S. PATENT DOCUMENTS

| 6,246,320 | B1 | * | 6/2001 | Monroe | 340/506 |
| 6,366,311 | B1 | * | 4/2002 | Monroe | 348/148 |
| 6,480,765 | B2 | * | 11/2002 | Gardner | 701/3 |
| 6,559,769 | B2 | * | 5/2003 | Anthony et al. | 340/574 |

FOREIGN PATENT DOCUMENTS

| DE | 197 32 180 A1 | 7/1997 |
| EP | 1 378 447 A1 | 1/2004 |
| FR | 2 753 588 | 9/1996 |
| WO | WO 00/03633 | 1/2000 |

* cited by examiner

Primary Examiner—Van T. Trieu
(74) Attorney, Agent, or Firm—Harness Dickey & Pierce P.L.C.

(57) ABSTRACT

In some configurations, the present invention is an apparatus for monitoring events on board a transportation vehicle. The apparatus includes a communication system configured to stream data from the transportation vehicle to an external location at least one monitoring device configured to collect video data, audio data, or both, from events occurring on the transportation vehicle; a latching mechanism in a location inaccessible during travel and configured to activate the communication system to stream data from the monitoring device or devices to the external location; and a switch configured to activate the latching mechanism when the switch is activated.

32 Claims, 5 Drawing Sheets

FIG. 5

METHODS AND APPARATUS FOR TRANSPORTATION VEHICLE SECURITY MONITORING

FIELD OF THE INVENTION

The present invention relates to methods and apparatus for monitoring events on board a transportation vehicle, especially events that occur after determination of an emergency or other types of unusual and/or potentially threatening occurrences.

BACKGROUND OF THE INVENTION

Aircraft manufacturers and commercial airline transportation companies expend considerable effort to ensure that passengers can count on routine and uneventful flights. Nevertheless, unforeseen events can occur on rare occasions. For example, it is impossible to ensure with complete certainty that an unexpected medical emergency requiring the services of a doctor on the ground will not occur at a time at which landing the aircraft is impractical.

In addition, despite careful screening, it is impossible to predict human behavior with complete certainty. Although real-time communication may be available with ground stations to provide advice to the crew or to allow an airport to handle most situations, overt communication while in flight may not be possible or even advisable during certain exceptional occurrences.

SUMMARY OF THE INVENTION

Various configurations of the present invention therefore provide an apparatus for monitoring events on board a transportation vehicle. The apparatus includes a communication system configured to stream data from the transportation vehicle to an external location at least one monitoring device configured to collect video data, audio data, or both, from events occurring on the transportation vehicle; a latching mechanism in a location inaccessible during travel and configured to activate the communication system to stream data from the monitoring device or devices to the external location; and a switch configured to activate the latching mechanism when the switch is activated.

Other configurations of the present invention provide an apparatus for monitoring events on board a transportation vehicle. In these configurations, the apparatus includes a receiver configured to receive video and audio data from a plurality of sources onboard a transportation vehicle and a plurality of display screens configured to display said video data. At least one of the display screens is configured as a high resolution display screen relative to other said display screens. These configurations also include a transmitter configured to transmit a control signal to the transportation vehicle to identify a camera on the transportation vehicle for transmission of high resolution data from the transportation vehicle to the high resolution display screen or screens.

Various configurations of the present invention provide a method for monitoring events on board a transportation vehicle. The method includes activating a latching mechanism on board the transportation vehicle while the transportation vehicle is traveling; supplying power from an uninterruptible source via the latching mechanism to a communication system; and transmitting, via the communication system, data from at least one monitoring device configured to collect video data, audio data, or both from events occurring on the transportation vehicle to a ground station.

Configurations of the present invention provide information that might otherwise not be available and that may be helpful to control unexpected and otherwise unpredictable passenger-initiated events, and to provide medical information to physicians on the ground or at a specified location who can provide help for treatment of individuals in flight needing medical attention. In other situations, configurations of the present invention provide information that might not otherwise be available for diagnosing unexpected mechanical or electrical failures in real time, or for determining the cause of otherwise mysterious accidents.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
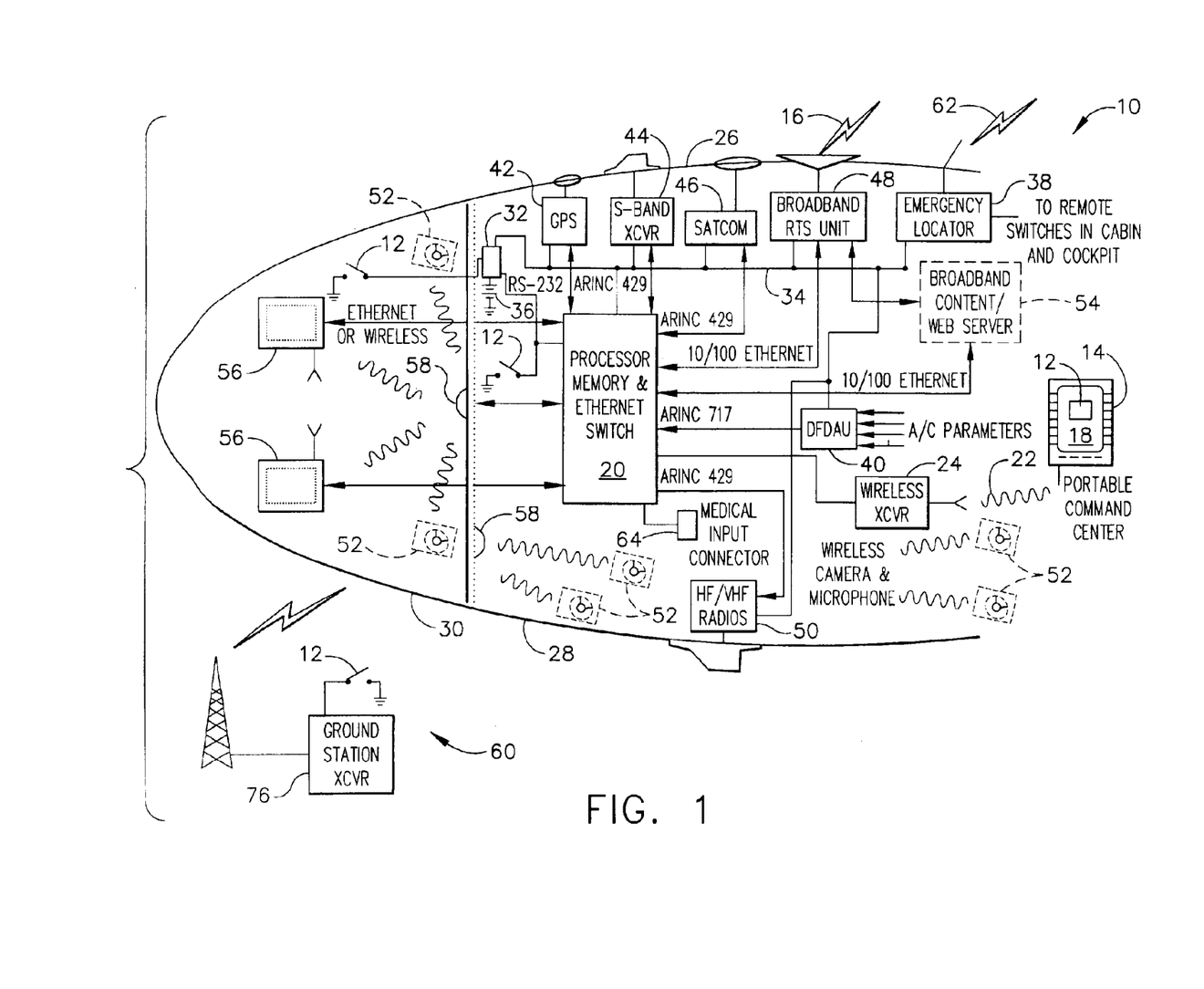
FIG. 1 is a schematic block diagram representation of various configurations of the present invention, shown in the context of an aircraft.

In various configurations of a security monitoring system 10 of the present invention and referring to FIG. 1, one or more "panic buttons" 12 such as a guarded switch, or an assignable key or dedicated button on a computing device 14, provides activation of off-aircraft data streaming 16 in emergency situations. The computing device is not limited to a laptop or aircraft computer. In some configurations, a personal digital assistant 14 or handheld computer having an assignable button or "virtual button," e.g., a touch-sensitive area of a screen 18, is utilized, and the button press is communicated to a processor 20 on the aircraft via a wired or wireless communication path 22. In configurations utilizing a wireless communication path 22, a wireless transceiver 24 is provided. One or more panic buttons 12 is/are provided in one or more locations on aircraft 26, such as the main cabin 28 and/or flight deck 30.

In an emergency situation, it is conceivable that aircraft power to critical equipment required for air-to-ground data streaming may be cut off. Therefore, in some configuration of the present invention, a latching mechanism 32 for providing power from an uninterruptible power source 36 to a hot battery bus 34 is provided in parallel with existing flight deck circuit breakers and wiring. (Latching mechanism 32 may be, for example, a latching relay. Other suitable devices for latching mechanism 32 include, but are not limited to, solid state switches or digital logic switches that provide similar control of power source 36.) controlling that provides Any panic button 12 is capable of activating latching mechanism 32, either via wiring or via wireless transceiver 24 and processor 20. A crew member or other authorized person presses a panic button 12 when a situation occurs while traveling (e.g., while the aircraft is in flight) that is adjudged to warrant monitoring by personnel on the ground. Pressing panic button 12 activates latching mechanism 32, which is in a location inaccessible to crew members and others while aircraft 26 is in the air, and which can be reset only by maintenance on the ground. When activated, contacts in relay 32 (or an equivalent function of a solid state switch or digital logic switch) provide a connection to a non-interruptible power source 36 to selected aircraft subsystems. The selection of aircraft subsystems powered by non-interruptible power source 36 when latching mechanism 32 is activated may be limited to only those required and/or used by security monitoring system 10 to thereby provide independence of security monitoring system 10 on other aircraft subsystems. In some configurations, the subsystems powered by non-interruptible power source 36 upon activation of latching mechanism 32 include one or more subsystems selected from a security processor 20 and memory core, one or more transponders 38, a Digital Flight Data Acquisition Unit/Aircraft Conditioning Monitoring System (DFDAU/ACMS) 40, and communication and navigation equipment such as a global positioning satellite (GPS) system 42; however, this list is intended only to be representative and not limiting. Uninterruptible power is also provided by power source 36 to at least a portion of a communication system comprising one or more components. For example, the communication system may include components such as an S-band transceiver 44, a satellite communication (SATCOM) system 46, a broadband RTS unit 48, one or more HF/VHF radios 50, and a broadcast system 54.

Also in some configurations of the present invention, aircraft data is collected, stored, and transmitted 16 to the ground after a panic button 12 is activated. A processor and memory/storage device 20 is utilized to collect data from one or more monitoring devices, for example, an onboard camera system comprising one or more cameras 52, ARINC 717 quick access recorder (QAR) data from DFDAU/ACMS 40, and/or other ARINC data. Data collected is compressed and formatted for storage, and routed to broadcast system 54. Video and audio data is collected, in some configurations, from wired and/or wireless cameras 52 located in main cabin 28 and in flight deck 30. Suitable cameras 52 include standard visible spectrum cameras and special purpose cameras such as thermal imaging or infrared cameras, and preferably include microphones for capturing sound in the vicinity of the imaging area. In some configurations, cameras 52 are wireless and transmit to one or more receivers 58 on board aircraft 26 which communicate with processor, memory and Ethernet switch 20. Data from the camera system is transmitted to an external location, e.g., ground station 60 via security monitoring system 10. In some configurations, one or more displays 56 are provided in the flight deck. Ground station 60 provides personnel and/or other resources to analyze the one or more received images to determine whether or not to retransmit any of the images back to the aircraft. In this way, ground station 60 remotely controls the availability of data from the camera system to displays 56 in the flight deck via transmissions received by one or more radio systems 44, 46, 48, or 50, in the event it is deemed that the images available from cameras 52 may detrimentally influence the actions of the pilots. However, in some configurations, both the flight deck crew and cabin crew are provided at their respective stations with indications that latching mechanism 32 and cameras 52 have been activated.

Processor 20 determines communication options, selects an optimum path, and routes data for transmission via the selected path. In some configurations, paths available for downlink of streaming audio/video data and redundant transponder-like data include, but are not limited to, aircraft legacy systems such as HF and/or VHF radio 50, SATCOM 46, S-band transceivers 44, broadband receiver transmitter systems (RTS) 48, and wireless IEEE 802.11 terminal wireless local area network (LAN) systems (not shown in FIG. 1). Also in some configurations, manual initiation of emergency locator transponder (ELT) 38 is coupled to the panic button, making a separate communication path 62 available for transponder communication if air traffic control (ATC) transponder information has somehow been compromised. In some configurations, rather than a simple ELT 38 that is unable to transmit its exact position, global positioning system (GPS) receiver and antenna 42 are housed within the same enclosure as ELT 38, with both systems independent of aircraft power and activated by panic button 12. In some configurations, GPS 42 need not be built into ELT 38 housing. Instead, ELT 38 utilizes signals from a GPS 42 already on board aircraft 26 or position and altitude information available from other aircraft sources (e.g., a communications server/router, which utilizes its own GPS or DFDAU inputs, not shown) to transmit location information.

Examples of the types of events that might occur that might cause a pilot to activate a panic button include emergency, life-threatening situations that endanger the aircraft, crew, and passengers; video surveillance required by legal authorities; documentation of disturbances by unruly passengers; and medical emergencies that require a video feed to physicians or other supporting personnel on the ground. To handle medical emergencies, some configurations of the present invention provide medical data input connectors 64 at one or more locations on aircraft 26 that are configured for cable connection of medical instruments. Thus, medical data such as EKGs, EEGs, and blood pressure readings may be transmitted to physicians on the ground, depending upon the type of medical emergency and the availability of onboard medical equipment.

The flight crew, cabin crew, or air marshal, upon the occurrence of a situation deemed to be an emergency, will activate a panic button 12 configured to bypass a circuit breaker panel (not shown) in flight deck 30 to thereby maintain electrical power to critical line replaceable units (LRUs) (e.g., 20, 40 and 54) associated with communication paths. Panic button 12 is activated utilizing either a hard-wired switch located in flight deck 30 and/or cabin 28 or an authenticated wireless device 14 communicating with a wireless transceiver 24. Either or both of these activation means are provided in configurations of the present invention, and more than one authenticated wireless device 14 is provided in some configurations. Examples of on-board devices suitable for activation as a "panic button" include, but are not limited to, wireless crew-operated flight deck displays 56, one or more cabin attendant wireless devices such as personal digital assistants (PDAs) 14 or special purpose wireless communication units, and command and control center handheld devices operated by on-board security personnel. A ground operation center 60 in communication with aircraft 26 is also provided with a wireless "panic button" 12 in some configurations of the present invention. Thus, even if those onboard the flight with the responsibility for activating a panic button are unable to do so, the same effect may be achieved by someone in a ground operation center 60.

Figure 2:
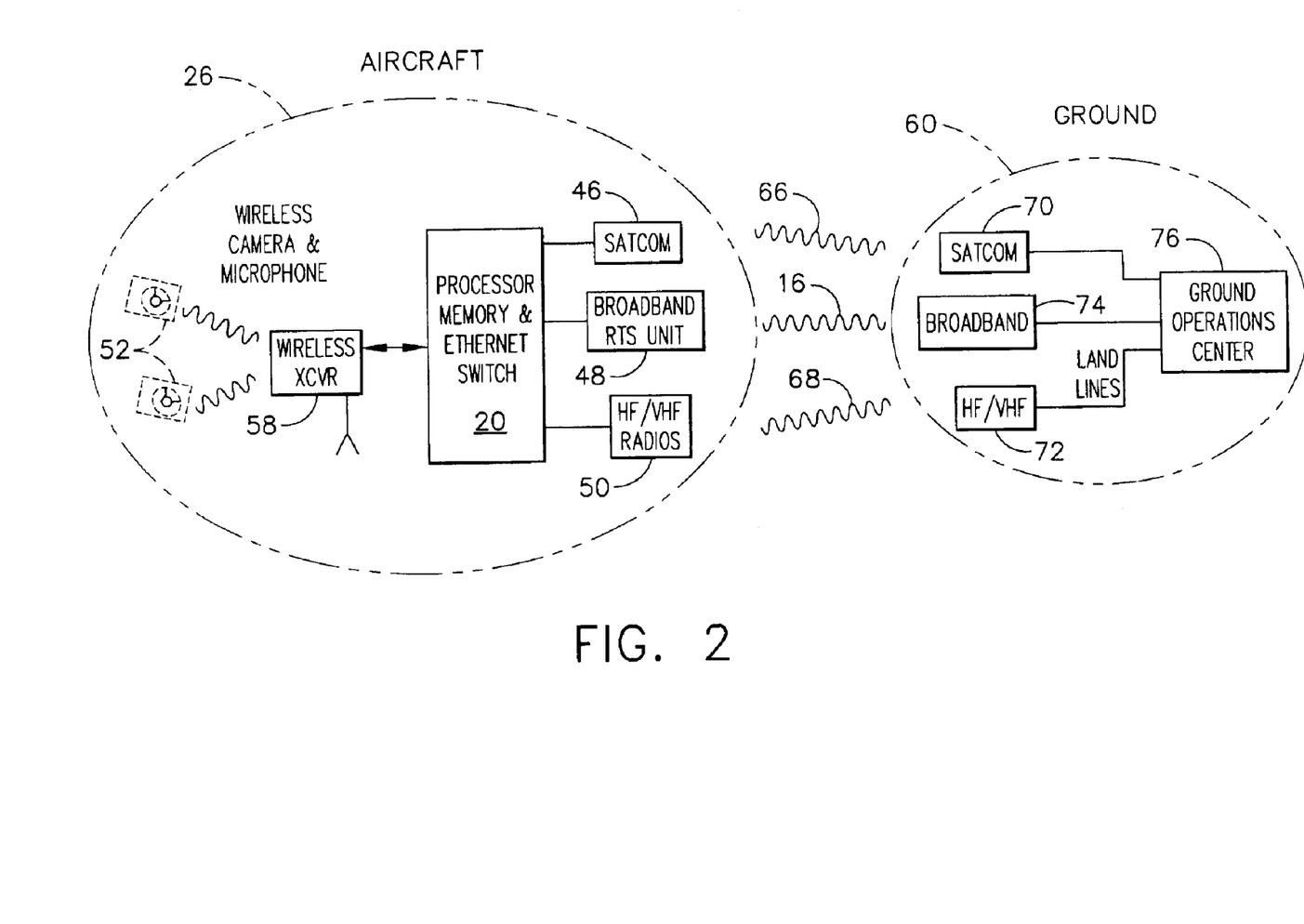
FIG. 2 is a schematic block diagram representation of various configurations of the present invention having a half duplex broadband communication link with a ground station.

When an emergency situation is signaled by the activation of a panic button 12, a server/router communication function is activated on aircraft 26. In some configurations of the present invention, this function is provided by processor, memory and an ethernet switch 20. Processor 20 memory includes a program configured to activate on-board cameras 52 and microphones and to determine whether a suitable path for real-time streaming of video information exists to the ground, such as a broadband connection via broadband RTS unit 16. In some configurations, a full duplex broadband connection having separate transmit and receive antennas (not shown in FIG. 1) is provided. A full duplex broadband connection allows incoming transmissions to continue without requiring a substantial load balancing shift to maintain available transmission resources (i.e., bandwidth, transmission time slots, transmission frequencies, and IEEE 802.11 allocations) that are required to send streaming video feeds from the aircraft to the ground. This feature allows panic button 12 to act as a silent alarm, with the incoming data unaffected by the initiation of an emergency situation. Also, some configurations of the present invention initiate a slow transfer of incoming bandwidth to outgoing bandwidth when more of the latter is required, to make the impact on incoming traffic less noticeable. In some configurations and referring to FIG. 2, only a half duplex broadband connection 16 is provided and separate time slices are provided for incoming and outgoing data. If a broadband connection is not available for any reason other than it is currently in use, another communication path, for example, HF and/or VHF 68, VDL Mode 2 (not shown in FIG. 2), or SATCOM 66, is selected. Ground station 60 includes receivers (which may also include transmitters) 70, 72, and 74 for receiving each type of transmission from aircraft 26 for analysis and display by ground operation center 76.

Panic buttons 12 can be configured for several levels of situations. For example, in the event of a truly life threatening situation, the highest level situation would be signaled. In configurations in which a broadband connection is available for a video downlink and a high level situation is signaled and again referring to FIG. 2, communications server/router (i.e., processor, memory and ethernet switch 20) is configured to act on this signal by distributing data to be communicated to ground through a plurality of paths 16, 66, and 68 to provide greater bandwidth for video imaging and/or to keep time delays to a minimum. For example, a distributed server application on board the aircraft is responsive to an automated decision logic that is resident in the processor and/or memory 20, wherein the decision logic is responsive to high level situation signals. The automated decision logic in some configurations is also responsive to verified requests received from ground operations security command centers to distribute data over a plurality of communication paths for this purpose. The automated decision logic controls the distributed server application to combine available communication resources to send video and audio data from the aircraft to the ground via a plurality of parallel aircraft transmission sources. A client application at a ground station 60 receiving transmissions 16, 66, and 68 recovers video and audio data from the plurality of transmission sources 48, 46, and 50. For example, a portion of the bandwidth of streaming video data may be sent via VHF link 68, while a remaining portion may be sent via SATCOM 66. In some configurations, if a broadband connection 16 is not available, the communications server router determines all available communications channels not required for critical voice/data communications and reconfigures these paths to provide the maximum bandwidth to transmit video and audio information.

Figure 3:
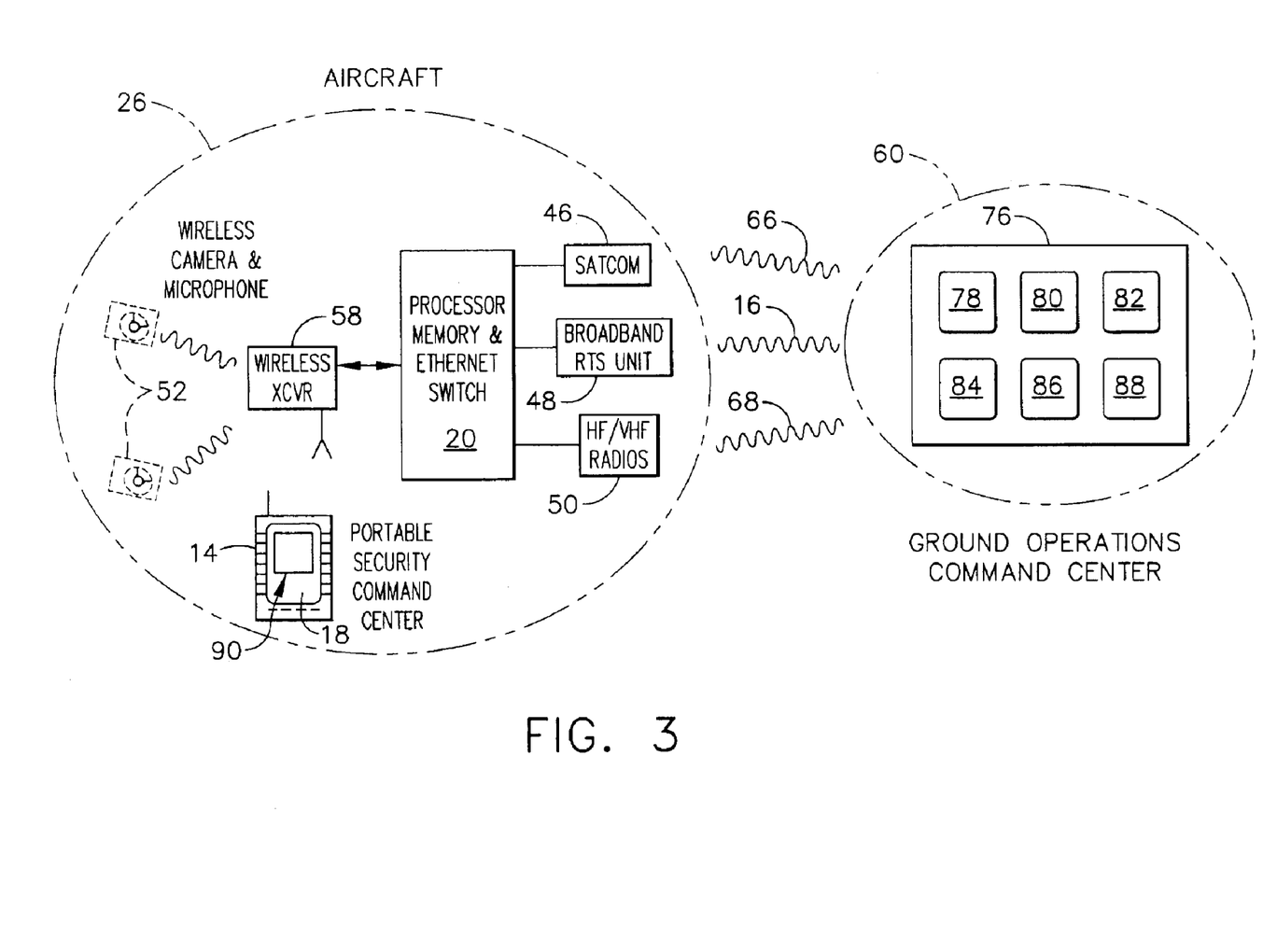
FIG. 3 is a schematic block diagram representation of various configurations of the present invention in which a ground station is configured to manage the resolution quality of incoming streaming video utilizing load balancing techniques.

Also in some configurations and referring to FIG. 3, ground operation centers 76 are configured to manage the resolution quality of incoming streaming video utilizing load-balancing techniques. For example, when receiving video data from an aircraft having six cameras 52 deployed and active (only two of which are shown in FIG. 3), a ground operation center camera viewing station provides one display screen for each camera. One display screen 80 has sufficient bandwidth for a high resolution display while the bandwidth of the remaining five display screens 78, 82, 84, 86, 88 are limited to a low resolution display when bandwidth is restricted. A command and control signal is sent via a transmitter (e.g., transceiver 70, 72, or 74, shown in FIG. 2) from ground operation center 60 to aircraft 26 to identify one or more desired high resolution cameras 52, and all other camera outputs are filtered to produce lower resolution data. In some configurations, a control is provided to the operator of an aircraft command center 60 to enable sequencing through individual camera streaming views, which would allow communication via a small fixed bandwidth to a small handheld device such as a PDA 18 for viewing one camera output 90 at a time on PDA screen 18.

Figure 4:
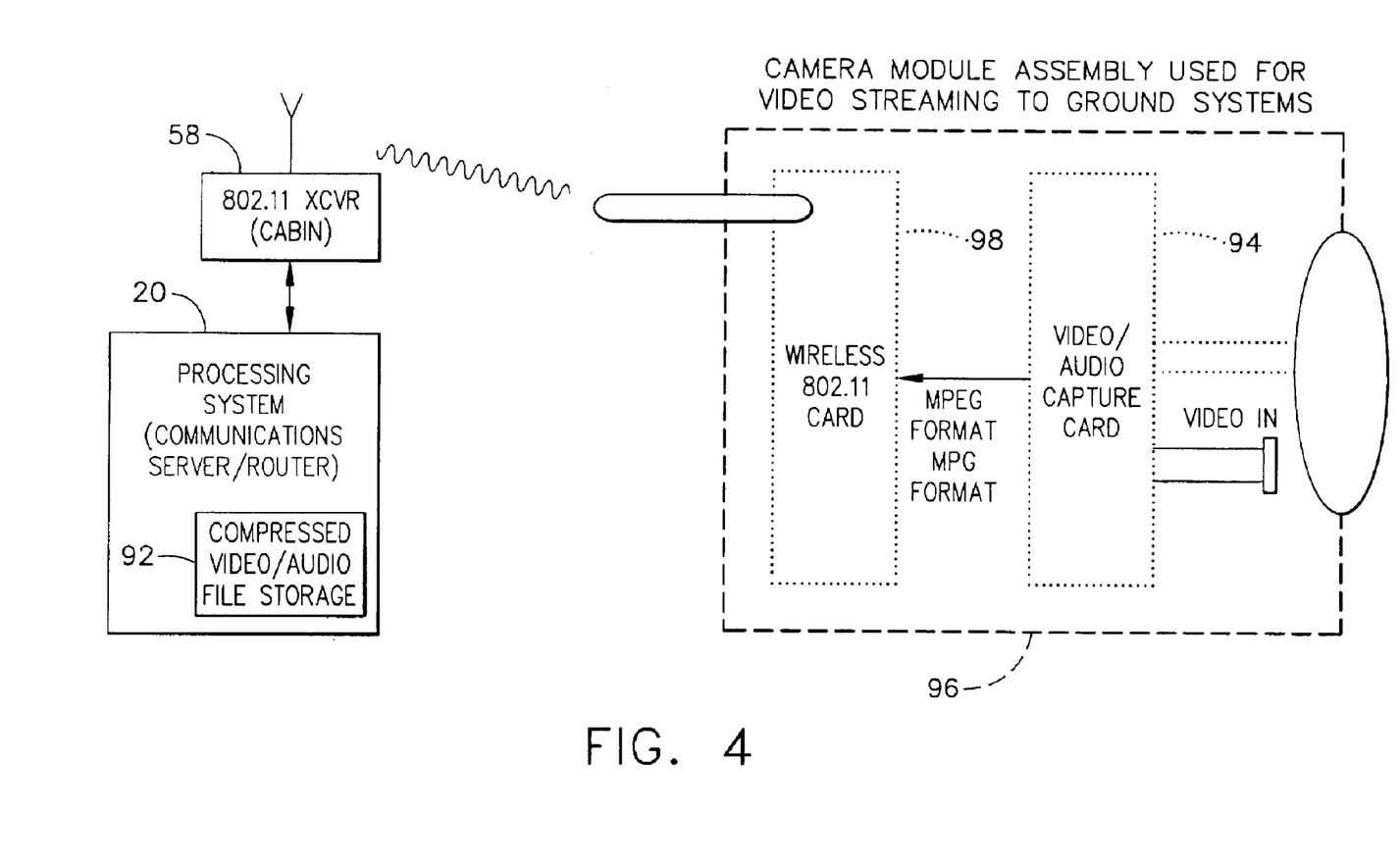
FIG. 4 is a schematic block diagram representation of a camera housing unit useful in various configurations of the present invention, showing how video and audio capture, compression, storage, buffering and transmission is provided within a camera housing unit, and how stored data is transmitted to a transceiver located in a cabin area inaccessible while the aircraft is in flight.
Figure 5:
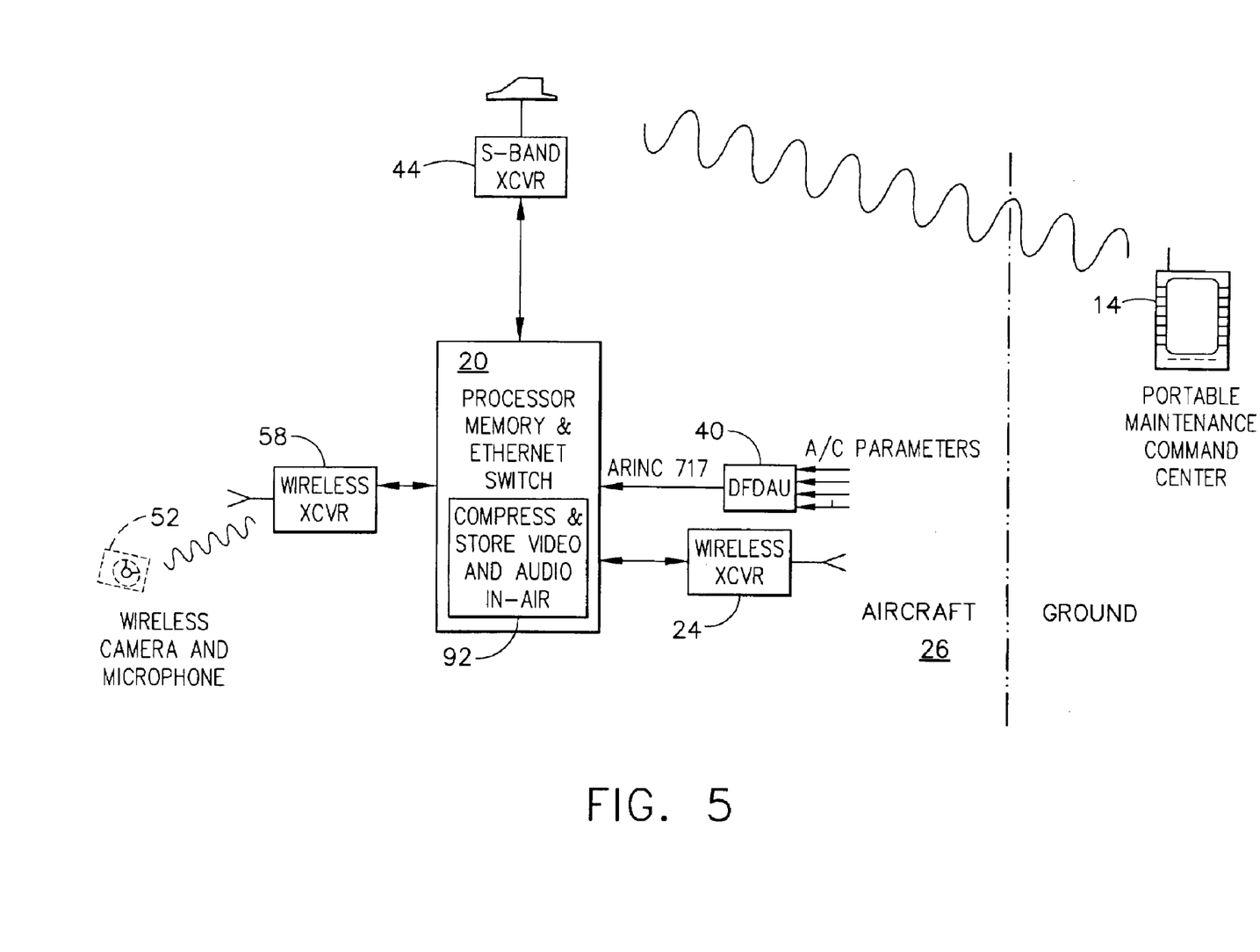
FIG. 5 is a schematic block diagram representation of a portion of various configurations of the present invention in which video and audio capture is provided by an Ethernet switch.

In various configurations and referring to FIG. 4, video and audio capture, compression, storage, buffering and transmission is provided in a card 94 within camera 52 housing units 96. Stored data is transmitted in MPEG format and MPG format via a wireless IEEE 802.11 card 98 to transceiver 58, which in some configurations is an IEEE 802.11 transceiver located in an cabin area inaccessible while the aircraft is in flight. In various configurations and referring to FIG. 5, video and audio capture, compression, buffering and transmission 92 are provided within processing, memory, and Ethernet switch 20. Processing units therein process digital audio and video signals, for example, MPEG-4 for video and MP3 for audio, or any other suitable format, and add a synchronization signal to the combination thereof. Encoded data is wirelessly transmitted to an on-board processing system for storage and active transmission (if required), or upon connection with a wireless network operations center (NOC) once on the ground and available. The NOC system decompresses and assembles the video and audio streaming data and performs other processing and routing as required. In some configurations, IEEE 802.11 transmission is used for transmission to the NOC.

Also in some configurations, DFDAU 40 ARINC 717 serial output, conforming to RS-422 standard, provides parametric data that can be made available utilizing an aircraft to NOC communication path configured as described herein. For operation between a mobile operator on the ground within wireless communication range of the aircraft, one or more wireless handheld devices 14 establish communication between an aircraft transceiver 44 configured as an access point and the mobile ground personnel handheld device 14.

It will thus be seen that configurations of the present invention provide information that might otherwise not be available and that may be helpful to control unexpected and otherwise unpredictable passenger-initiated events, and to provide medical information to physicians on the ground who can provide help for treatment of individuals in flight needing medical attention. In other situations, configurations of the present invention provide information that might not otherwise be available for diagnosing unexpected mechanical or electrical failures in real time, or for determining the cause of otherwise mysterious accidents.

In addition to providing streaming real-time audio and video in the event of an emergency, the present invention also can assist airlines in improving procedures and responses to abnormal incidents that do not rise to the level of an emergency, or for determining trends that can be used to assist in preventative maintenance and forecasting of spare parts allocation. Training departments can utilize actual video footage obtained in various situations to further improve safety and to improve airline policies and procedures. Furthermore, configurations of the present invention utilizing on-board cameras are also useful to assist aircraft manufacturers, certification authorities, equipment vendors and airlines in monitoring displays and instruments, providing a "pilot's eye view," and in reducing or eliminating installation of bulky flight test telemetry and instrumentation equipment and wiring.

Although the configurations of the present invention are described above in the context of an aircraft, other configurations of the present invention are not limited to aircraft installation or use. For example, configurations of the present invention are also applicable more generally to transportation vehicles. For example, with a suitable external location such as dispatching point, central office, or monitoring station serving as the ground station, configurations of the present invention are applicable to busses, trains, subway trains, and even taxicabs. In each case, configurations of the present invention include a latching mechanism in a location inaccessible during travel, for example, behind a firewall of the vehicle or in an engine compartment. For practical reasons, the communication options available for non-aircraft configurations of the present invention may be different from (and perhaps more limited) than those available for aircraft configurations. It should be noted that the term "ground station," as used herein with respect to non-aircraft configurations, is intended to encompass external locations such as dispatching points, central offices, or monitoring stations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for monitoring events on board a transportation vehicle, said apparatus comprising:
    a communication system configured to stream data from the transportation vehicle to an external location;
    at least one monitoring device configured to collect video data, audio data, or both, from events occurring on the transportation vehicle;
    a latching mechanism that is located to be inaccessible and unable to be disabled by anyone on board the transportation vehicle during travel of the transportation vehicle and configured to provide power to activate the communication system to stream data from the at least one monitoring device to the external location; and
    a switch configured to activate the latching mechanism when the switch is activated.

2. An apparatus in accordance with claim 1 wherein the transportation vehicle is an aircraft and said apparatus further comprises an uninterruptible power source configured to supply power to at least a portion of the communication system when the latching mechanism activates the communication system to stream the data from the aircraft to the external location.

3. An apparatus in accordance with claim 2 wherein said at least one monitoring device comprises at least one camera.

4. An apparatus in accordance with claim 3 wherein the camera is a wireless camera.

5. An apparatus in accordance with claim 3 further comprising a display in a flight deck of the aircraft configured to display an image observed by the camera.

6. An apparatus in accordance with claim 5 wherein the communication system further comprises a receiver electronically coupled to the flight deck display and configured to receive the image displayed on the flight deck display under control of a station at the external location.

7. An apparatus in accordance with claim 2 wherein the uninterruptible power source is configured to provide power, after said switch activates said latching mechanism, only to selected aircraft subsystems utilized by said apparatus.

8. An apparatus in accordance with claim 1 wherein the switch comprises at least one of a personal digital assistant or handheld computer.

9. An apparatus in accordance with claim 1 further comprising an emergency locator transponder and global positioning system receiver in a single enclosure configured to transmit location information when activated.

10. An apparatus in accordance with claim 9 in an aircraft, and further wherein both said emergency locator transponder and said global positioning system receiver are powered independently of other aircraft power sources.

11. An apparatus in accordance with claim 1 further comprising a medical data input connector configured for cable connection of medical instruments and configured to permit medical data to be transmitted to a ground station via said apparatus.

12. An apparatus in accordance with claim 1 wherein said communication system comprises at least one transmitter providing transmission resources, and said communication system is configured to perform load balancing in accordance with available transmission resources.

13. An apparatus in accordance with claim 1 wherein said at least one monitoring device comprises a plurality of cameras, and said communication system is responsive to a control signal received from a ground station to control a bandwidth of transmission of each said camera to the ground station in accordance with the received control signal.

14. An apparatus in accordance with claim 13 wherein the transportation vehicle is an aircraft and said apparatus further comprises at least one ground station, wherein said ground station comprises:
    a receiver configured to receive video data from said plurality of cameras;
    a plurality of display screens configured to display said video data, wherein at least one said display screen is configured as a high resolution display screen relative to other said display screens; and a transmitter configured to transmit said control signal to the aircraft to control a bandwidth of transmission of each said camera, wherein one said camera is designated for transmitting high resolution data to said high resolution display screen.

15. An apparatus in accordance with claim 1 wherein said latching mechanism comprises a latching relay.

16. The apparatus of claim 1, wherein said communication system comprises a transmit antenna and a receive antenna and configured to provide a full duplex broadband connection with a station at the external location.

17. The apparatus of claim 1, wherein said communication system configured to have a plurality of communication paths to stream data from the transportation vehicle to the external location and to automatically select which of the communication paths to utilize to stream the data based on a usage status of each of the communication paths when the switch is activated.

18. The apparatus of claim 17, wherein said communication system further configured to automatically distribute the streaming data among a plurality of the communication paths based on a usage status of each of the communication paths when the switch is activated.

19. An apparatus for monitoring events on board a transportation vehicle, said apparatus located remotely from said transportation vehicle and comprising:

a receiver configured to receive video and audio data from a plurality of sources on board a transportation vehicle;

a plurality of display screens configured to display said video data, wherein at least one said display screen is configured as a high, resolution display screen relative to other said display screens; and a transmitter configured to transmit a control signal to the transportation vehicle to identify a camera on the transportation vehicle for transmission of high resolution data from the transportation vehicle to a said high resolution display screen.

20. An apparatus in accordance with claim 19 wherein the transportation vehicle is an aircraft and said apparatus further comprises, a transmitter configured to selectively control retransmission of video data received from the aircraft back to the aircraft.

21. A method for monitoring events on board a transportation vehicle, said method comprising:

installing a latching mechanism on board the transportation vehicle in a location that is inaccessible by anyone on board the transportation vehicle such that once activated the latching can not be deactivated by anyone on board the transportation vehicle while the transportation vehicle is traveling:

activating the latching mechanism on board the transportation vehicle while the transportation vehicle is traveling;

supplying power from an uninterruptible source via the latching mechanism to a communication system; and transmitting, via the communication system, data from at least one monitoring device configured to collect video data, audio data, or both from events occurring on the transportation vehicle to a ground station.

22. A method in accordance with claim 21 wherein the transportation vehicle is an aircraft and said transmitting comprises transmitting video data from at least one camera on the aircraft.

23. A method in accordance with claim 22 wherein said transmitting video data from at least one camera further comprises transmitting video data from at least one wireless camera on board the aircraft.

24. A method in accordance with claim 22 further comprising displaying an image from the at least one camera on a display in a flight deck of the aircraft.

25. A method in accordance with claim 24 wherein said displaying an image on a display in a flight deck of the aircraft comprises receiving, from the ground station, a retransmitted image from the at least one camera, under control of the ground station.

26. A method in accordance with claim 22 further comprising analyzing, at the ground station, the received image from the at least one camera to determine whether or not to retransmit an image from the at least one camera to make the image from the at least one camera available for display on a display in a flight deck of the aircraft.

27. A method in accordance with claim 22 further comprising:

connecting a medical instrument to a medical data input connector on board the transportation vehicle to communicatively connect the medical instrument to the communication system: and transmitting medical data via the communication system following said switching of the latching mechanism.

28. A method in accordance with claim 21 wherein the communication system provides a plurality of transmitting resources, and further comprising adjusting a transmission bandwidth from the at least one monitoring device in accordance with available transmitting resources.

29. A method in accordance with claim 21 wherein said activating a latching mechanism comprises activating a latching relay.

30. The method of claim 21, wherein transmitting comprises providing a full duplex broadband connection with the ground station, via a transmit antenna and a receive antenna included in the communication system, for transmitting the video data, the audio data or both.

31. The method of claim 21, wherein transmitting comprises automatically selecting which of a plurality communication paths, provided by the communication system, to transmit the video data, the audio data or both to the ground station based on the a usage status of each of the communication paths when the switch is activated.

32. The method of claim 31, wherein automatically selecting comprises automatically distributing the video data, the audio data or both among a plurality of the communication paths based on the a usage status of each of the communication paths when the switch is activated.

* * * * *